UNITED STATES PATENT OFFICE.

OTTO RÖHM, OF DARMSTADT, GERMANY.

PROCESS OF MAKING CAOUTCHOUC SUBSTITUTE.

1,121,134. Specification of Letters Patent. Patented Dec. 15, 1914.

No Drawing. Application filed January 28, 1913. Serial No. 744,731.

*To all whom it may concern:*

Be it known that I, OTTO RÖHM, a subject of the Emperor of Germany, residing in Darmstadt, Germany, have invented a certain new and useful Process of Making Caoutchouc Substitute, of which the following is a specification.

My invention relates to a new process of making caoutchouc substitute, and it has relation also to the said substitute as an article of manufacture.

My invention has for its object to produce a caoutchouc substitute by the vulcanization of the solid acrylic acid esters obtained by polymerization.

I have discovered the fact that a caoutchouc substitute may be produced by the vulcanization of solid acrylic acid esters obtained by polymerization. The fact that such a substitute could be thus produced could not have been predicted or foreseen because the acrylic acid esters do not belong to the compounds from which the formation of natural caoutchouc can be explained.

According to one method of vulcanization employed by me I take 95 parts, more or less, of solid acrylic-acid ester and mix the same with 5 parts, more or less, of sulfur in a rolling mill or other suitable apparatus until a homogeneous mass is produced. Such mass is then heated in any suitable receptacle to about 40 degrees centigrade for two hours more or less.

The polymerized esters referred to herein are colorless and are transparent like glass and become hard when left to lie for a considerable time. The vulcanization of these esters results in the production of opaque products the color of which, when sulfur alone is employed, is yellow varying to brown or gray according to circumstances.

The physical properties of the vulcanized products depend upon the kind and duration of the vulcanizing process and cannot, therefore, be stated in detail, but it is essential that such products maintain permanently their once acquired properties, namely, considerable hardness, expansibility and indifference to chemical influences, as, for instance, indifference to strong acids or alkalis.

I am aware of the fact that a caoutchouc substitute has heretofore been obtained by vulcanizing of polymerization products of isoprene and other similar hydrocarbons; but that process or method of producing caoutchouc substitute is objectionable by reason of the fact that it is very expensive owing to the fact that expensive turpentine oil must be used as the starting point for the preparation of isoprene. The method hereinbefore described which is employed by me for the production of a caoutchouc substitute possesses the merit of great cheapness because of the fact that in the preparation of acrylic acid esters inexpensive glycerin or lactic acid and similar compounds serve as a starting point.

I have not herein described the method of producing the acrylic acid esters because it is known already.

I claim:—

1. The process of making caoutchouc substitute which consists in the vulcanization of any acrylic acid ester.

2. The process of making caoutchouc substitute which consists in the vulcanization of any solid acrylic acid ester.

3. The process of making caoutchouc substitute which consists in the vulcanization of any solid acrylic acid ester obtained by polymerization.

4. A caoutchouc substitute formed by the vulcanization of an acrylic acid ester.

5. A caoutchouc substitute formed by the vulcanization of a solid acrylic acid ester obtained by polymerization.

6. The process of making caoutchouc substitute which consists in combining solid acryl-acid ester with sulfur.

In testimony that I claim the foregoing as my invention, I have hereunto signed my name this 15 day of January, A. D. 1913, at Darmstadt, Germany.

OTTO RÖHM.

In the presence of—
 RICHARD KAUTTER,
 HUGO ALWY.